UNITED STATES PATENT OFFICE.

JOHN FEENEY, OF LODI, NEW JERSEY.

PROCESS FOR TREATING WICKS.

1,379,857.      Specification of Letters Patent.      Patented May 31, 1921.

No Drawing.     Application filed December 18, 1920. Serial No. 431,799.

*To all whom it may concern:*

Be it known that I, JOHN FEENEY, a citizen of the United States, residing at Lodi, in the county of Bergen and State of New Jersey, have invented certain new and useful Improvements in Processes for Treating Wicks, of which the following is a specification.

This invention has relation to a process for treating lamp wicks or the like to render the same smokeless and more durable, as well as to impart other qualities which render the wick more desirable than untreated wicks as will readily appear as the invention is more clearly understood.

In addition to the foregoing the invention comprehends the exact steps of the process to be hereinafter set forth, the exact chemicals and their chemical equivalents as well as other alterations in the exposition to be set forth within the spirit of the invention and the scope of the appended claim.

As a preliminary operation to the treatment of a lamp wick it is necessary to prepare a solution which consists essentially of lime and water. For this purpose I procure a good quality of unslaked lime or calcium-oxid which is immersed in water and permitted to slake. The proportion may vary, but I have found that three parts by weight of water to one part by weight of lime is a combination that is of the best results. As stated above the lime is permitted to slake with the accompaniment of heat. And the mass is thoroughly stirred and permitted to stand until it is found that a sample of the liquid when drawn off will have a specific gravity of one degree, or in other words until the strength of the liquid is such as to render the same 1.100 times the weight of water. It is absolutely necessary that the solution of lime attain this strength before proceeding with the further steps of the process. However, after the solution has attained this strength and permitted to settle the clear liquid is siphoned off from the sediment and it is this clear liquid which is used for the lamp wicks. A desired quantity of the liquid is placed in any suitable container which may be heated and the wicks immersed in the liquid and boiled. The proportion may vary, but I have found in practice that two parts by weight of solution would be sufficient to treat five parts by weight of the wicks. In any event the immersed wicks are boiled for three hours or until a sample of the liquid drawn off will be found to have increased in strength to one and one-half degrees on the hydrometric scale or in other words 1.500 times the weight of water. It is necessary that the solution arrive at this strength before the boiling of the mixture is discontinued. However, as soon as this point has been attained the wicks are removed and then thoroughly dried. They will be found to have acquired a whitish appearance and to have altered somewhat in the internal structure of the fibers which could not be seen except upon microscopic examination. It is in the results that the difference between the treated and untreated wicks is noted. It has been found that such wicks result in the production of a clear smokeless flame when used in lamps or stoves of the inclosed type or with the production of a smokeless blue flame in stoves of the Argand burner type. Furthermore, the wicks are more durable than untreated wicks and will not accumulate a carbonized edge.

Other peculiar qualities are imparted thereto which will only render themselves apparent after one has an opportunity to use the wicks and to note the superior results obtained.

While I have described my invention with considerable particularity, the ingredients employed in my process as well as the various steps may be varied by others in an attempt to avoid the protection afforded by my patent. I therefore desire to reserve the privilege of modifying the exact order of the step as hereinbefore outlined, to alter the various quantities of materials used as well as to employ other chemicals which may be considered chemical equivalents of those stated, without departing from the spirit of the invention or the scope of the appended claim.

Having thus described my invention what I claim as new and desire to secure by United States Letters Patent is:—

The herein described method of treating lamp wicks which consists of first preparing a solution of lime water to a strength of one degree on a hydrometric scale, then immersing the wicks in the solution, then boiling the wicks and solution for three hours or until the solution has reached the strength of one and one-half degrees on the hydrometric scale, and finally drying the wicks.

In testimony whereof I affix my signature in presence of a witness.

JOHN FEENEY. [L. S.]

Witness:
WM. ZEAMAN.